United States Patent Office 3,280,085
Patented Oct. 18, 1966

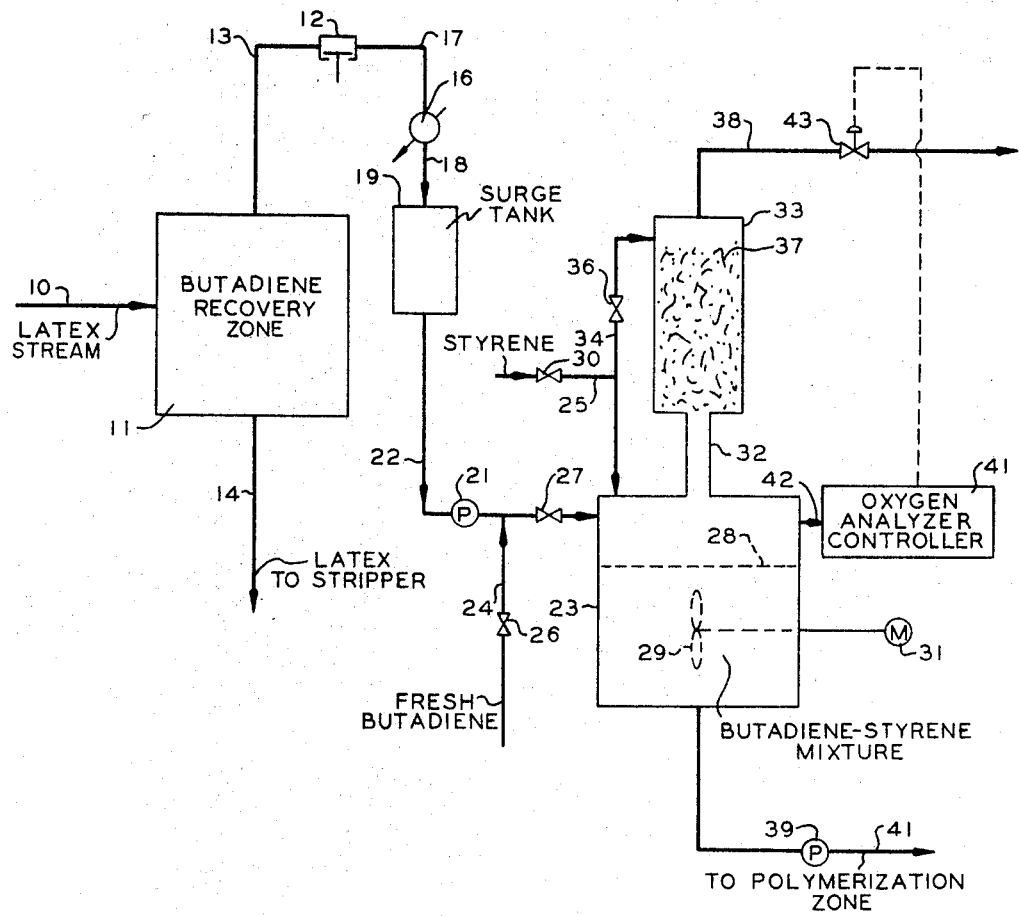

3,280,085
PURIFICATION OF MONOMERS
Louis D. Kleiss, Phillips, Tex., assignor to Phillips Petroleum Company, a corporation of Delaware
Filed July 16, 1962, Ser. No. 210,175
8 Claims. (Cl. 260—85.1)

This invention relates to the removal of oxygen and other noncondensable gases from monomeric materials. In one aspect, the invention relates to an improved method for purifying a conjugated diene containing a fixed gas impurity. In another of its aspects, the invention relates to an improved method for controlling the oxygen content of the monomers charged to an emulsion polymerization reaction.

When copolymerizing an aliphatic conjugated diene, such as 1,3-butadiene, isoprene or piperylene, and a compound copolymerizable therewith containing an active $CH_2=C<$ group, such as styrene, acrylonitrile or methyl methacrylate, to produce a synthetic elastomer, unreacted monomers are usually present in the reaction mixture recovered from the polymerization. When utilizing an emulsion polymerization process to produce the synthetic elastomers, the monomers, which are not converted in the polymerization reaction, are generally recovered from the latex by a multi-step separation process, at least one step employing pressure below atmospheric. It is very difficult when employing such a recovery process to exclude all traces of atmospheric oxygen, and the recovered monomers, therefore, usually contain quantities of oxygen. Furthermore, since the contaminating oxygen is derived from the atmosphere, the oxygen-contaminated monomers generally contain free nitrogen as well.

It has been previously determined that oxygen dissolved in the monomers has a marked effect upon the rate of polymerization of these materials. In general, in a cold rubber process, the amount of oxygen present should not exceed 10 parts per million. It has also been found that varying concentrations of dissolved oxygen in, for example, a mixture of 1,3-butadiene and styrene, cause the rates of polymerization to vary. As a result, it is difficult to determine whether a batch of butadiene and styrene will copolymerize at the normally expected rate. When rates of reaction vary, the temperature and the extent of conversion become difficult to control and the character of the polymer formed may be impaired. Since the copolymerization reaction is exothermic, too rapid a rate of reaction tends to increase the temperature of the system by virtue of overloading the cooling system. When producing cold rubber, it is particularly important to maintain the temperature of the polymerization reaction and the extent of conversion within relatively narrow limits to produce the desired polymer.

It is an object of this invention, therefore, to provide an improved method for purifying the unreacted monomers recovered from a polymerization process.

Another object of the invention is to provide a process for removing oxygen from the monomers employed in an emulsion polymerization process without unduly large monomer losses.

Still another object of the invention is to provide a process for controlling the amount of oxygen contained in the mixture of monomers charged to an emulsion polymerization reaction.

A further object of the invention is to provide a process for purifying monomers, which does not require the utilization of additional materials.

Other and further objects and advantages of the invention will become apparent to those skilled in the art from a consideration of the accompanying disclosure and the drawing which illustrates a preferred embodiment of the invention.

Broadly speaking, the present invention is concerned with an improvement in a process whereby a mixture of a conjugated diene and a compound copolymerizable therewith containing an active $CH_2=C<$ group is polymerized in an emulsion polymerization zone. In accordance with this improvement, the latex stream containing unreacted conjugated diene and copolymerizable compound recovered from the aforementioned zone is introduced into a flash zone maintained at sub-atmospheric pressure. A vaporous stream containing conjugated diene and a fixed gas impurity is recovered from the flash zone and then at least partially condensed prior to introduction into a mixing or blending zone. A vaporous stream containing conjugated diene and fixed gas impurity is taken overhead from the mixing zone and passed into an absorption zone wherein it is contacted with the copolymerizable compound. As a result of this contacting, the copolymerizable compound selectively extracts a major portion of the conjugated diene from the vaporous stream. Unabsorbed gases containing the fixed gas impurity are recovered overhead from the absorption zone while the copolymerizable compound enriched with the absorbed conjugated diene flows into the mixing zone. In carrying out the process, it is preferred that the copolymerizable compound have a normal boiling point at least 50° F. higher than the conjugated diene.

In one embodiment of the invention, the oxygen content of the vapors in the mixing zone is determined by means of an oxygen analyzer-controller. This instrument, by manipulation of flow rates or other operating conditions, controls the amount of unabsorbed gases recovered from the absorption zone so as to maintain a predetermined concentration of oxygen in the vapors present in the mixing zone.

As is well known, the emulsion polymerization of monomeric materials is conducted in a polymerization zone which may contain in addition to the monomers an emulsifying agent, reaction modifier, oxidant, activator, freezing point depressant, and other ingredients, depending upon the specific polymerization recipe used and the type of polymer desired. The amount of these materials used will be understood by those skilled in the art. The polymerization may be conducted in batches, semi-continuously or continuously. The total pressure on the reactants is usually at least sufficient to insure that the initial reactants will be present in liquid phase. Generally, 50 to 98 percent of the monomeric materials are polymerized, depending upon when the reaction is shortstopped in accordance with the type of polymer desired.

The emulsion polymerization reaction can be conducted at a temperature which varies over a relatively wide range. The actual temperature used will depend upon the polymerization recipe employed and the type of polymer desired. For example, the polymerization can be conducted under low temperature conditions, such as below 50° F. and in some instances as low as −40° F. Furthermore, the polymerization can be carried out under high temperature conditions, such as at a temperature of 100° F. or higher.

The process of this invention is applicable to the treatment of polymer-containing streams obtained by polymerizing a mixture of an aliphatic conjugated diene, preferably containing from 4 to 8 carbon atoms per molecule, with a compound copolymerizable therewith containing an active $CH_2=C<$ group. Examples of suitable conjugated dienes include 1,3-butadiene, 2,3-diemthyl-1,3-butadiene, isoprene, piperylene, 3-furyl-1,3-butadiene, chloroprene, and the like. Examples of suitable compounds copolymerizable with the conjugated diene include aryl olefins, such as styrene, various alkyl styrenes, p-chlorostyrene, p-methoxystyrene, alpha-methylstyrene, vinylnaphthylene and similar derivatives thereof, and the like; acrylic and substituted acrylic acids and their esters, such as acrylic acid, methacrylic acid, methyl acrylate, ethyl acrylate, methyl alpha-chloroacrylate, methyl methacrylate, butyl methacrylate, methyl ethacrylate, acrylonitrile, methacrylonitrile, and the like. As mentioned hereinbefore, the copolymerizable compoud has a boiling point which is higher than that of the conjugated diene. Specific examples of mixtures of monomers which are applicable to the present process include 1,3-butadiene and styrene; isoprene and styrene; pentadiene and styrene; butadiene and acrylic acid; isoprene and acrylic acid; pentadiene and acrylic acid; butadiene and acrylonitrile; isoprene and acrylonitrile; pentadiene and acrylonitrile; 2,3-dimethyl-1,3-butadiene and styrene; 2,3-dimethyl-1,3-butadiene and acrylic acid; 2,3-dimethyl-1,3-butadiene and vinylpyridine; chloroprene and styrene; chlorprene and acrylic acid; and chloroprene and vinylpyridine. It is to be understood that substituted styrenes, substituted acrylic acids and substituted vinylpyridines can also be employed in admixture with the aforementioned conjugated dienes. Although the present invention is applicable to a number of possible reactants, it is particularly applicable to the emulsion polymerization process which utilizes a mixtures of 1,3-butadiene and styrene. Accordingly, the invention will be discussed hereinafter with relation to these particular monomers. When conducting a polymerization with these monomers, they are usually used in ratios of butadiene to styrene between 65:35 and 90:10 by weight.

Referring now to the drawing, a latex stream containing unreacted 1,3-butadiene and styrene flows through line 10 from a polymerization reactor and enters butadiene recovery zone 11. The butadiene recovery zone comprises one or more flash tanks, at least one of which is operated at a sub-atmospheric pressure. The pressure is maintained on the flash tank by means of compressor 12 which is connected to recovery zone 11 by means of line 13. The latex stream containing substantially no butadiene and most of the styrene is withdrawn from the recovery zone through line 14. This stream is thereafter passed to a stripping operation wherein the styrene is recovered. After being freed of any entrained water, the styrene can be recycled to the butadiene-styrene mixing tank as described hereinafter. Because of the difference in monomer recovery methods employed, the styrene stream does not contain sufficient dissolved oxygen to influence the polymerization reaction and the use of recycled styrene has little or no effect on the production of the polymers.

The vaporous stream recovered from recovery zone 11 through line 13 is composed principally of butadiene although a small amount of styrene may be present. After flowing through compressor 12, this vaporous stream enters cooler 16 through line 17. In cooler 16, the vapors are at least partially condensed, and the resulting liquid butadiene stream is withdrawn therefrom through line 18 and passed into surge tank 19. The butadiene stream recovered by the described vacuum process may have a concentration of oxygen as great as 100 or more parts per million. By proceeding in accordance with the present invention as described hereinafter, it has been found that the oxygen content of the feed mixture can be maintained at a substantially constant value in the range of 3 to 25 parts per million without encountering large butadiene losses as would result, e.g., by purging noncondensable vapors from tank 19. By maintaining the oxygen content substantially constant at this low value, it has been found that the polymerization reaction can be satisfactorily carried out with economic advantage over prior art processes.

By means of pump 21, a butadiene stream containing dissolved oxygen and other non-condensable gases is pumped from surge tank 19 through line 22 and then passed into mixing or blending tank 23. Line 24 connected to line 22 provides means for introducing fresh butadiene into the system. The amount of fresh butadiene added in this manner is sufficient to maintain a desired butadiene/styrene ratio in blend tank 23. Lines 22 and 24 are provided with suitable flow control means 26 and 27, which function to control the amount of butadiene charged to the blend tank. Styrene is charged to blend tank 23 through line 25 which also includes a flow control means 30 for adjusting the amount of styrene charged to the tank. The styrene charged to the tank in this manner may include recycle as well as fresh styrene.

Blend tank 23 contains a mixture of butadiene and styrene, the liquid-vapor interface of the mixture being designated by numeral 28. This mixture is continuously agitated by stirrer 29 which is rotated by motor 31. By continuous stirring of the mixture, vapor-liquid equilibrium and proper deaeration are achieved. It has been found to be particularly advantageous to accomplish the deaeration in the monomer mixing tank since the partial pressure of butadiene is diminished by being in admixture with styrene. As a result, the concentration ratio of oxygen in the vapor above surface 28 of the butadiene-styrene mixture to oxygen in the liquid mixture is greater than elsewhere in the process. The vapor which forms in the upper portion of blend tank 23 comprises butadiene, oxygen and other noncondensable gases, such as nitrogen. This vapor rises through conduit 32 and passes upwardly through absorber 33. Line 34 connected between line 25 and the upper portion of absorber 33 provides means for introducing styrene into the absorber. The amount of styrene introduced in this manner is controlled by flow control means 36 positioned in line 34. It is to be understood that all of the styrene charged to the mixing tank can be introduced through the absorber. In general, an amount is introduced through the absorber which is sufficient to selectively absorb substantially all of the butadiene in the vapor rising through conduit 32. This amount is usually in the range of 10 to 90 weight percent of the total amount of styrene charged to the mixing tank. The styrene introduced into the absorber flows downwardly therethrough, contacting the rising vapor and selectively absorbing the butadiene. The absorber is provided with a suitable packing material 37, such as Berl saddles, Raschig rings or the like, or other vapor-liquid contacting means, in order to ensure good contact between the styrene and the vapors. The styrene enriched with the butadiene flows downwardly through conduit 32 and then enters mixing tank 23. The unabsorbed gases comprising primarily oxygen and other noncondensable gases are removed overhead from absorber 33 through line 38 and finally vented to the atmosphere. As a result of this operation, the butadiene-styrene mixture in the mixing tank has a desirably low oxygen content and the vapors withdrawn via line 38 do not require reprocessing to prevent excessive losses of butadiene. The feed mixture is pumped by means of pump 39 from the mixing tank and passed through line 41 to the polymerization zone.

The operating conditions of temperature and pressure maintained in various parts of the apparatus illustrated in the drawing are tabulated in the following table. The numbers in parentheses refer to reference numerals shown in the drawing.

TABLE I

| Apparatus | Temperature, °F. | Pressure |
| --- | --- | --- |
| Butadiene Recovery Zone (11) | 80–120 | 100–250 mm. of Hg. |
| Compressor (12): | | |
| Inlet | 80–120 | 100–250 mm. of Hg. |
| Outlet | 150–300 | 35–85 p.s.i.a. |
| Cooler (16): | | |
| Inlet | 150–300 | 35–85 p.s.i.a. |
| Outlet | 60–120 | 30–80 p.s.i.a. |
| Blending Tank (23) | 60–120 | 25–75 p.s.i.a. |
| Absorber (33): | | |
| Top | 60–120 | 25–75 p.s.i.a. |
| Bottom | 60–120 | 25–75 p.s.i.a. |

In a preferred embodiment of the invention, an oxygen analyzer-controller 41 is utilized to control the concentration of oxygen present in the vapor space of mixing tank 23. In the operation of the control system, a sample of the vapor in the vapor space is passed through line 42 to the oxygen analyzer-controller. Oxygen anaylzer-controllers are well known, and a suitable instrument is described in copending application U.S. Serial No. 455,612, filed September 13, 1954, now U.S. Patent 3,073,808. The oxygen analyzer-controller is given a setting, the value of which corresponds to the concentration of oxygen which it is desired that the vapor in the vapor space of the mixing tank contain. The instrument analyzes the sample stream for oxygen content and generates a signal proportional to the oxygen content. This signal is supplied to the controller which manipulates the setting of motor valve 43 in accordance with this signal so as to obtain the desired oxygen concentration. For example, if the sample stream contains more oxygen than the predetermined set amount, the instrument system operates to open valve 43, thereby permitting more gases to be vented to the atmosphere. Conversely, when the sample stream contains less than the predetermined set amount, the instrument system functions to reduce the opening of the motor valve.

A more comprehensive understanding of the invention can be obtained by referring to the following illustrative example, which is not intended, however, to be unduly limitative of the invention.

*Example*

In a typical process for the copolymerization of butadiene and styrene, 60 weight percent of the butadiene and styrene charged to the reactor system is polymerized. A latex stream containing unreacted butadiene and styrene is recovered from the polymerization zone and introduced into butadiene recovery zone 11. This butadiene recovery zone comprises several flash tanks, the last of which is operated at a temperature of 100° F. and an absolute pressure of 200 mm. of mercury. The latex stream charged to the butadiene recovery zone contains 62,000 pounds per day of unreacted butadiene and 15,000 pounds per day of unreacted styrene together with water, polymer and the various other ingredients utilized in the polymerization recipe. Flashing of this stream in zone 11 results in the recovery of 60,000 pounds per day of butadiene through line 13. After compression and cooling, the butadiene stream is passed to surge tank 19 and thereafter pumped into mixing tank 23. The latex stream recovered from butadiene recovery zone 11 through line 14 is thereafter passed to a stripping zone wherein the remaining butadiene and the styrene are separated from the latex. After drying, the separated styrene is recycled to mixing tank 23 through line 25. Additional fresh butadiene and styrene are added to lines 22 and 25 so as to provide a mixture in the mixing tank containing 75 weight percent butadiene and 25 weight percent styrene.

The butadiene-styrene mixture in mixing tank 23 is continuously agitated by means of stirrer 29. The mixing tank is maintained at about 100° F. and the pressure therein is from 2 to 10 p.s.i. greater than the equilibrium vapor pressure of the butadiene-styrene mixture at this temperature. Vapors forming in the upper portion of mixing tank 23 contain butadiene, free oxygen and other noncondensable gases. This vapor is passed upwardly into absorber 33 wherein it contacts styrene charged to the absorber through line 34. In contacting the vapor, the styrene selectively absorbs most of the butadiene, thereafter flowing downwardly into the mixing tank. The unabsorbed gases are removed from absorber 33 through line 38 and then vented to the atmosphere. The oxygen content of the butadiene-styrene mixture in mixing tank 23 is about 6.5 parts per million. Since the butadiene stream recovered from surge tank 19 contains about 75 parts per million of oxygen, it it seen that the present process provides an efficient method for removing oxygen from the feed mixture. The butadiene-styrene mixture is removed from mixing tank 23 through line 41 and then pumped to the polymerization zone.

In the table below the material balance for the above-described process is described. The numerals in the heading of the table refer to reference numerals shown in the drawing.

TABLE II

[Plant stream material balance thousands of pounds per day]

| Component | Stream | | | | | | |
|---|---|---|---|---|---|---|---|
| | 10 | 14 | 22 | 24 | 25 | 34 | 38 | 41 |
| Butadiene | 62 | 2 | 60 | 95 | | | trace | 155 |
| Styrene | 15 | 15 | trace | | 37.5 | 10 | trace | 37.5 |
| Oxygen plus other noncondensable gases | trace | | 2.25 | trace | | | 1.625 | 0.625 |
| Water | 400 | 400 | trace | | | | | |
| Polymer | 115.5 | 115.5 | | | | | | |
| Miscellaneous ¹ | 12 | 12 | | | | | | |

¹ Includes soap, initiator, and shortstop components, modifiers, etc.

It will be apparent that various modifications of the invention can be practiced by studying the accompanying disclosure without departing from the spirit and scope of the invention.

I claim:

1. In a process in which a mixture of a first monomer selected from the group consisting of aliphatic hydrocarbon conjugated dienes and halogen substituted conjugated dienes and a second monomer copolymerizable therewith containing an active $CH_2{=}C{<}$ and selected from the group consisting of aryl olefins, acrylic acid, hydrocarbon substituted acrylic acids, and halogen substituted acrylic acids is polymerized in an emulsion polymerization zone and a latex containing unreacted first monomer and second monomer is recovered from said polymerization zone, said second monomer having a normal boiling point at least 50° F. higher than the normal boiling point of said first monomer and said first monomer being soluble in said second monomer; the improvement which comprises introducing said latex into a flash zone maintained at sub-atmospheric pressure, recovering from said flash zone a vaporous stream containing first monomer and a fixed gas impurity, at least partially condensing said vaporous stream, introducing the thus at least partially condensed stream into a mixing zone, passing a vaporous stream containing first monomer and fixed gas impurity overhead from said mixing zone into an absorption zone, introducing into said absorption zone an amount of said second monomer sufficient to selectively absorb substantially all of the first monomer from said vaporous stream passing through said absorption zone, removing unabsorbed gases overhead from said absorption zone, and flowing the resulting stream of second monomer enriched with absorbed first monomer into said mixing zone.

2. The process according to claim 1 in which said first monomer is 1,3-butadiene and said second monomer is styrene.

3. The process according to claim 1 in which said first monomer is isoprene and said second monomer is styrene.

4. The process according to claim 1 in which said first monomer is chloroprene and said second monomer is styrene.

5. The process according to claim 1 in which said first monomer is piperylene and said second monomer is styrene.

6. In a process in which a mixture of 1,3-butadiene and styrene is polymerized in an emulsion polymerization zone and a latex stream containing unreacted butadiene and styrene is recovered from said zone, the improvement which comprises introducing said latex stream into a flash zone maintained at sub-atmospheric pressure; recovering from said flash zone a vaporous stream containing conjugated diene and free oxygen; at least partially condensing said vaporous stream; introducing said condensed stream into a mixing zone; passing a vaporous stream containing butadiene and oxygen overhead from said mixing zone into an absorption zone; introducing styrene into an upper portion of said absorption zone; flowing said styrene downwardly through said absorption zone, thereby contacting said vaporous stream and selectively extracting butadiene therefrom; removing overhead from said absorption zone a stream containing oxygen; and flowing styrene enriched with butadiene into said mixing zone.

7. The process according to claim 6 in which a sample vaporous stream containing butadiene and oxygen is removed from said mixing zone and passed to an analyzing zone where a signal proportional to the oxygen content of said stream is generated; and said stream containing oxygen is withdrawn from said absorption zone at a rate such as to maintain said signal at a predetermined value.

8. The process according to claim 6 in which the weight ratio of butadiene to styrene in said mixing tank is between 65:35 and 90:10.

References Cited by the Examiner

UNITED STATES PATENTS

| | | | |
|---|---|---|---|
| 2,905,732 | 9/1959 | Fauske | 260—681.5 |
| 2,914,589 | 11/1959 | Mertz | 260—681.5 |
| 2,920,113 | 1/1960 | Pollock et al. | 260—83.3 |

JOSEPH L. SCHOFER, *Primary Examiner.*

LEON J. BERCOVITZ, *Examiner.*

C. R. REAP, H. I. CANTOR, *Assistant Examiners.*